(12) United States Patent
White et al.

(10) Patent No.: US 7,009,149 B2
(45) Date of Patent: Mar. 7, 2006

(54) SLOW COOKER AND STAND

(75) Inventors: Kelly M. White, Hudson, MA (US); Richard McDuffie, Worcester, MA (US); David Bossa, Uxbridge, MA (US)

(73) Assignee: JCS/THG, LLC, Milford, MA (US)

( * ) Notice: Subject to any disclaimer, the term of this patent is extended or adjusted under 35 U.S.C. 154(b) by 0 days.

(21) Appl. No.: 10/928,865

(22) Filed: Aug. 27, 2004

(65) Prior Publication Data

US 2005/0173402 A1 Aug. 11, 2005

Related U.S. Application Data

(63) Continuation-in-part of application No. 29/197,215, filed on Jan. 9, 2004, now Pat. No. Des. 503,584.

(51) Int. Cl.
A47J 27/20 (2006.01)
A47J 36/34 (2006.01)

(52) U.S. Cl. ............. 219/432; 219/429; 219/433; 99/403

(58) Field of Classification Search ........... 279/429, 279/432, 433; 99/403
See application file for complete search history.

(56) References Cited

U.S. PATENT DOCUMENTS

| | | | | |
|---|---|---|---|---|
| 2,682,602 | A | * | 6/1954 | Huck ................. 219/433 |
| D181,149 | S | | 10/1957 | Hoffstein et al. |
| D183,133 | S | | 7/1958 | Lax |
| 3,681,568 | A | * | 8/1972 | Shaefer ............. 219/432 |
| D232,412 | S | | 8/1974 | Schmitt |
| 3,908,111 | A | * | 9/1975 | Du Bois et al. ........ 219/442 |
| D247,946 | S | | 5/1978 | Painter et al. |
| D248,079 | S | | 6/1978 | Painter et al. |
| D268,471 | S | | 4/1983 | Gremonprez |
| D270,030 | S | | 8/1983 | Catry |
| D286,605 | S | | 11/1986 | Broere |
| D316,944 | S | | 5/1991 | Manna |
| D366,592 | S | | 1/1996 | Cesaroni et al. |
| 6,100,504 | A | * | 8/2000 | Wagner ............. 219/432 |
| D434,940 | S | | 12/2000 | Hlava et al. |
| 6,177,655 | B1 | * | 1/2001 | Toman ............. 219/432 |
| D444,993 | S | | 7/2001 | Dobson et al. |
| D445,298 | S | | 7/2001 | DeBord et al. |
| D450,528 | S | | 11/2001 | Rossman |
| 6,373,031 | B1 | | 4/2002 | Barrow |
| D460,314 | S | | 7/2002 | Bodum |
| 6,443,052 | B1 | * | 9/2002 | Garber et al. ........ 99/339 |
| 6,603,099 | B1 | * | 8/2003 | Gouthiere .......... 219/432 |
| 6,734,402 | B1 | * | 5/2004 | Chenglin .......... 219/433 |
| 6,872,921 | B1 | * | 3/2005 | DeCobert et al. ...... 219/441 |

FOREIGN PATENT DOCUMENTS

WO   WO2005004678 A2 *  1/2005

OTHER PUBLICATIONS

Visual Presentation of "Crock Pot® Versaware" at the Gourmet Show in May 2003.

* cited by examiner

*Primary Examiner*—Joseph Pelham
(74) *Attorney, Agent, or Firm*—Hoffmann & Baron, LLP; Francis E. Marino

(57) ABSTRACT

A slow cooker is provided that includes a ceramic cooking vessel and a base for supporting and heating the cooking vessel. The cooking vessel preferably extends substantially the upper surface of the base when mounted thereto. A stand is provided for supporting the base, and is preferably secured to the base. The stand includes handles that allow the slow cooker to be carried. The top of the base is preferably defined by a heat resistant, polymeric lip.

24 Claims, 10 Drawing Sheets

SLOW COOKER AND STAND

This application is a continuation-in-part of application Ser. No. 29/197,215 filed Jan. 9, 2004 now U.S. Pat. No. D, 503,584.

BACKGROUND OF THE INVENTION

1. Field of the Invention

The field of the invention relates to slow cookers including ceramic cooking vessels and bases for receiving the vessels.

2. Brief Description of the Related Art

Slow cookers have been available for many years, and are used for cooking food at relatively low temperatures ever relatively long periods of time compared to other cooking methods. Cooking times using a slow cooker are generally between four and eight hours.

A slow cooker is comprised of a base and a cooking vessel. The base includes one or more heating elements and defines a cavity for receiving the vessel. The cooking vessel is comprised of ceramic material having heat-retaining properties. It includes a peripheral lip that rests on the upper surface of the base. The lip forms the upper end of the cooking vessel and is the only portion of the cooking vessel that is positioned outside the cavity of the base. Opposing sides of the lip often include extensions forming handles.

The base of a slow cooker is ordinarily comprised of an outer wall, an inner liner, and a heating element that extends around the inner liner. The heating element is positioned within the outer wall. A control device such as a dial is mounted to the outer wall for controlling the cooking temperature, cooking time, and/or other functions. The inner liner is made from metal, and includes a top edge portion that is curled over the top edge of the outer wall. The base further includes a plate-like bottom that retains the lower edge portion of the outer wall. The bottom wall of the liner is positioned above the plate-like bottom. The plate-like bottom often includes feet to support the slow cooker on a counter top or other surface. Handles are secured to the outer walls of slow cooker bases to allow the bases and associated cooking vessels to be transported.

The cooking vessels employed in slow cookers are capable of withstanding the temperatures associated with such appliances. They generally include ribs on their bottom surfaces to provide strength. Heating slow cooker vessels in appliances other than slow cookers is ordinarily not recommended.

SUMMARY OF THE INVENTION

The invention relates to a slow cooker having a base for heating a cooking vessel. A controller is mounted to the base. A ceramic cooking vessel is provided for use with the base. The vessel engages an upper surface of the base and includes a side wall extending substantially above the upper surface of the base. A lid is mounted to the vessel.

A stand is preferably provided for supporting the base. The base preferably includes an upper lip that engages the stand. The side wall of the vessel adjoins the upper lip, preferably tapering inwardly in the direction of the base.

The invention is further directed to a slow cooker comprising a base for heating a cooking vessel, the base including an upper lip, a plate-like bottom, and a side wall connecting the upper lip and plate-like bottom. A controller is mounted to the base. A ceramic cooking vessel engages in an upper surface of the base. A lid is mounted to the cooking vessel. A stand supports the base. The stand includes a plurality of legs extending downwardly along the side wall of the base, feet coupled to the legs, the feet being positioned beneath the base, and a pair of diametrically opposed handles.

The invention further relates to a slow cooker comprising a base for heating a cooking vessel, the base including an outer wall, a bottom wall, a metal liner, a heating element within the outer wall and adjoining the liner, and a heat resistant polymeric lip secured to the liner. The metal liner defines a cavity including a top opening, and the lip bounds the top opening of the cavity. A ceramic cooking vessel is positionable at least partially within the cavity and engageable with the polymeric lip. The lip is preferably comprised of a phenolic compound.

DETAILED DESCRIPTION OF THE INVENTION

Figure 1:
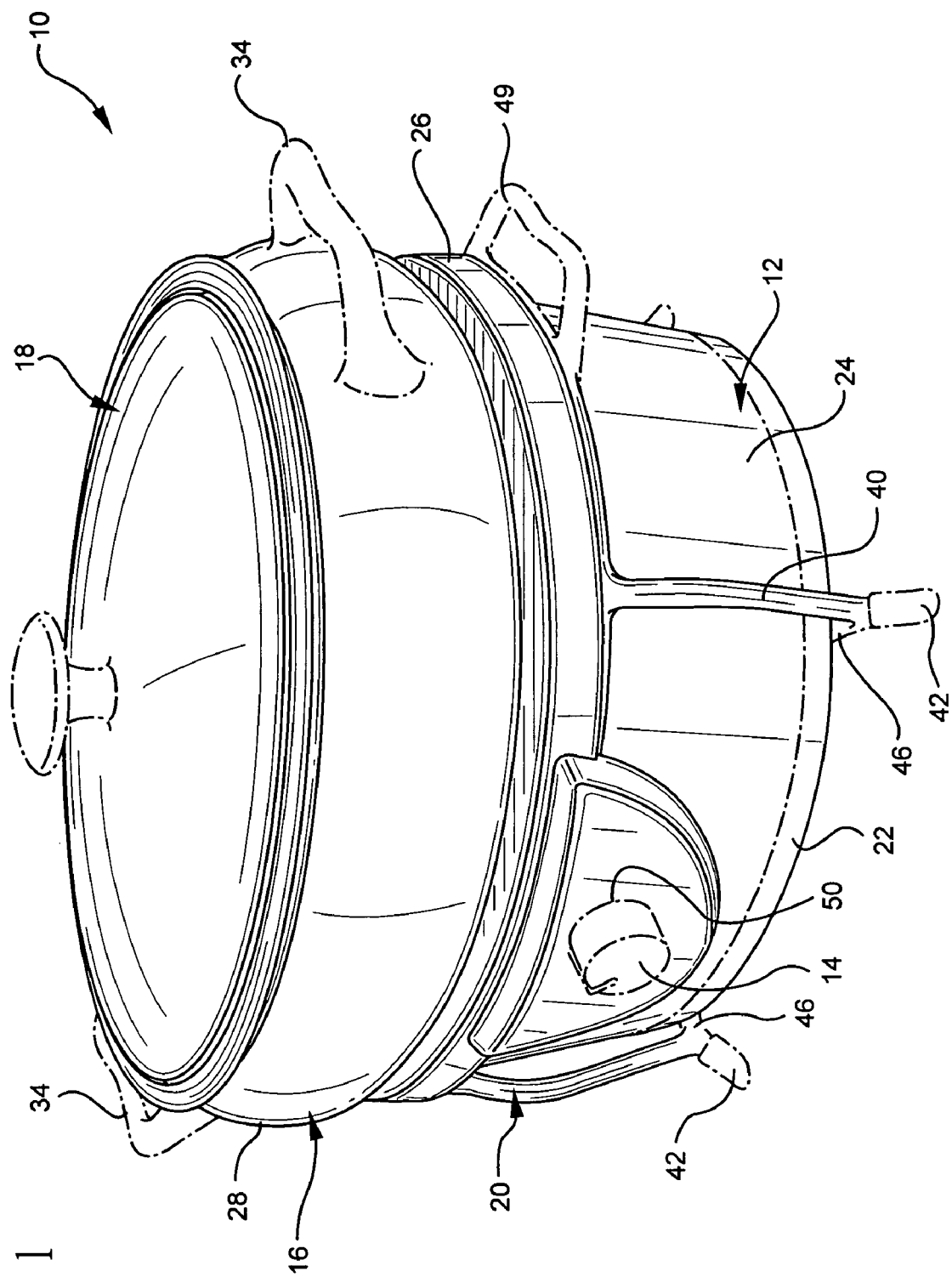
FIG. 1 is a top perspective view of a slow cooker and stand in accordance with the invention.

The detailed description which follows relates to preferred embodiments of the invention, and is not intended to limit the scope of the invention to such preferred embodiments.

A slow cooker 10 in accordance with a first preferred embodiment of the invention is shown in FIGS. 1–4. It includes a base 12, a controller 14 mounted to the base, a cooking vessel 16, a lid 18 on the cooking vessel, and a stand 20.

Figure 2:
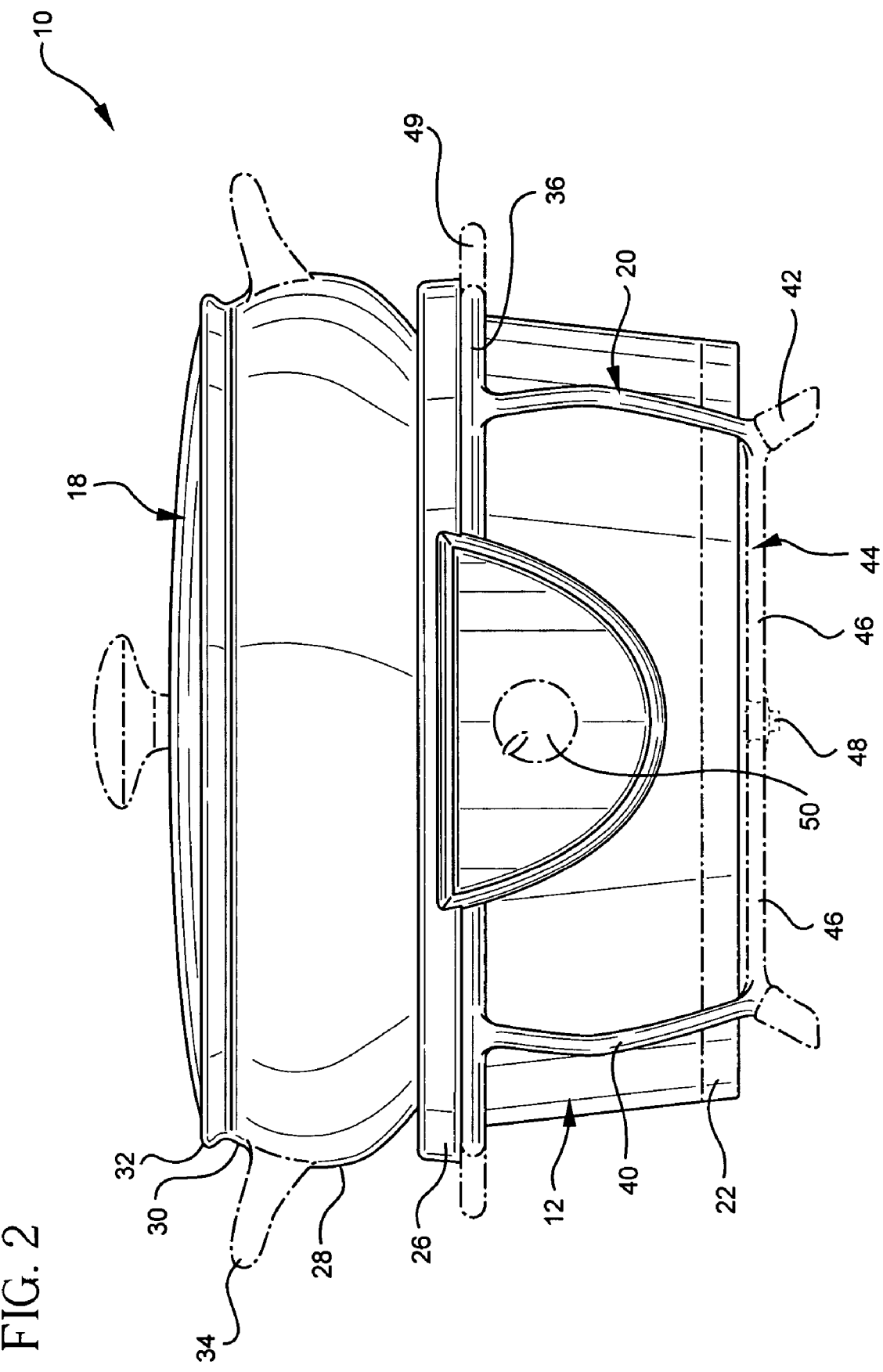
FIG. 2 is a front elevation view thereof.
Figure 3:
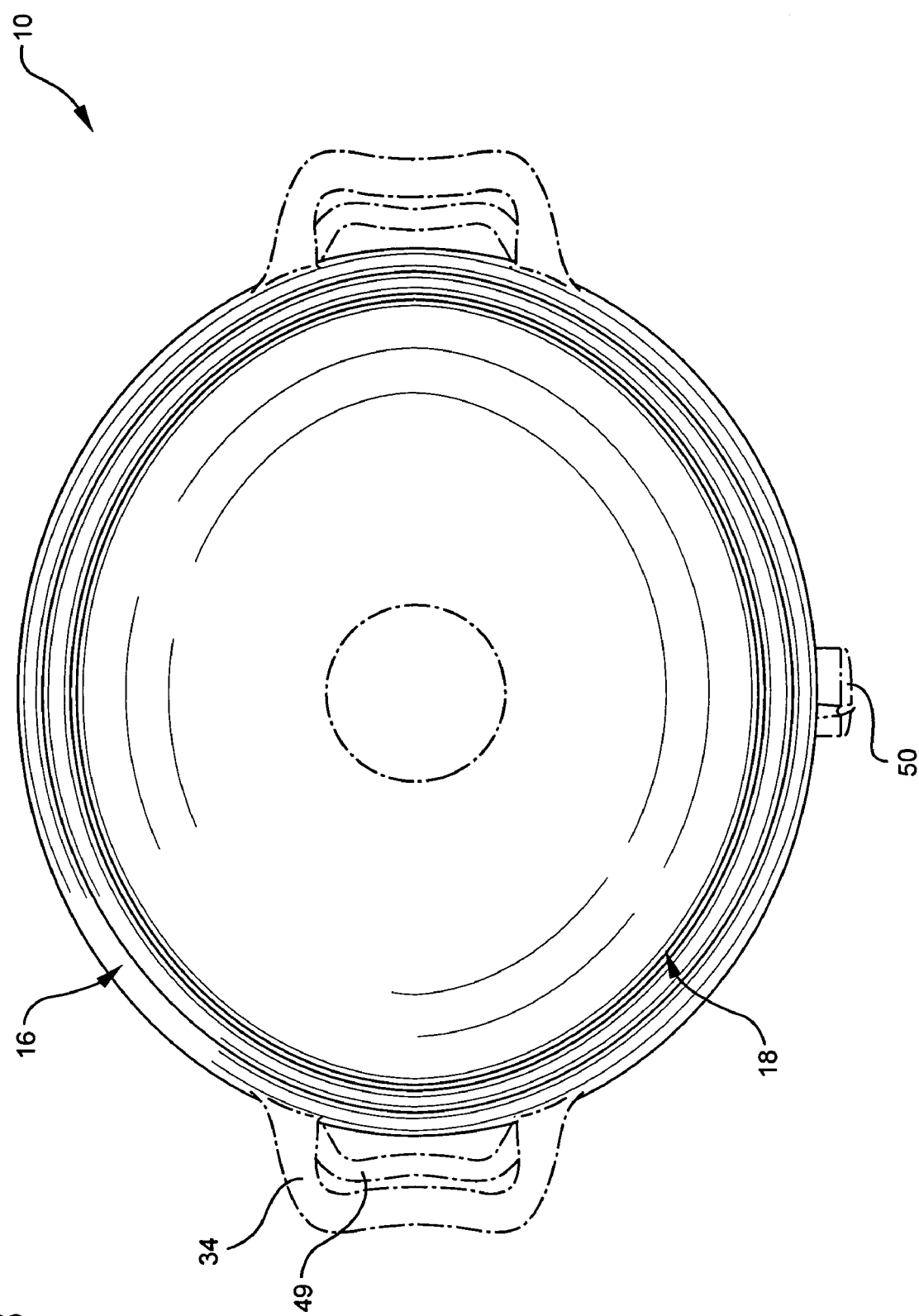
FIG. 3 is a top plan view thereof.
Figure 4:
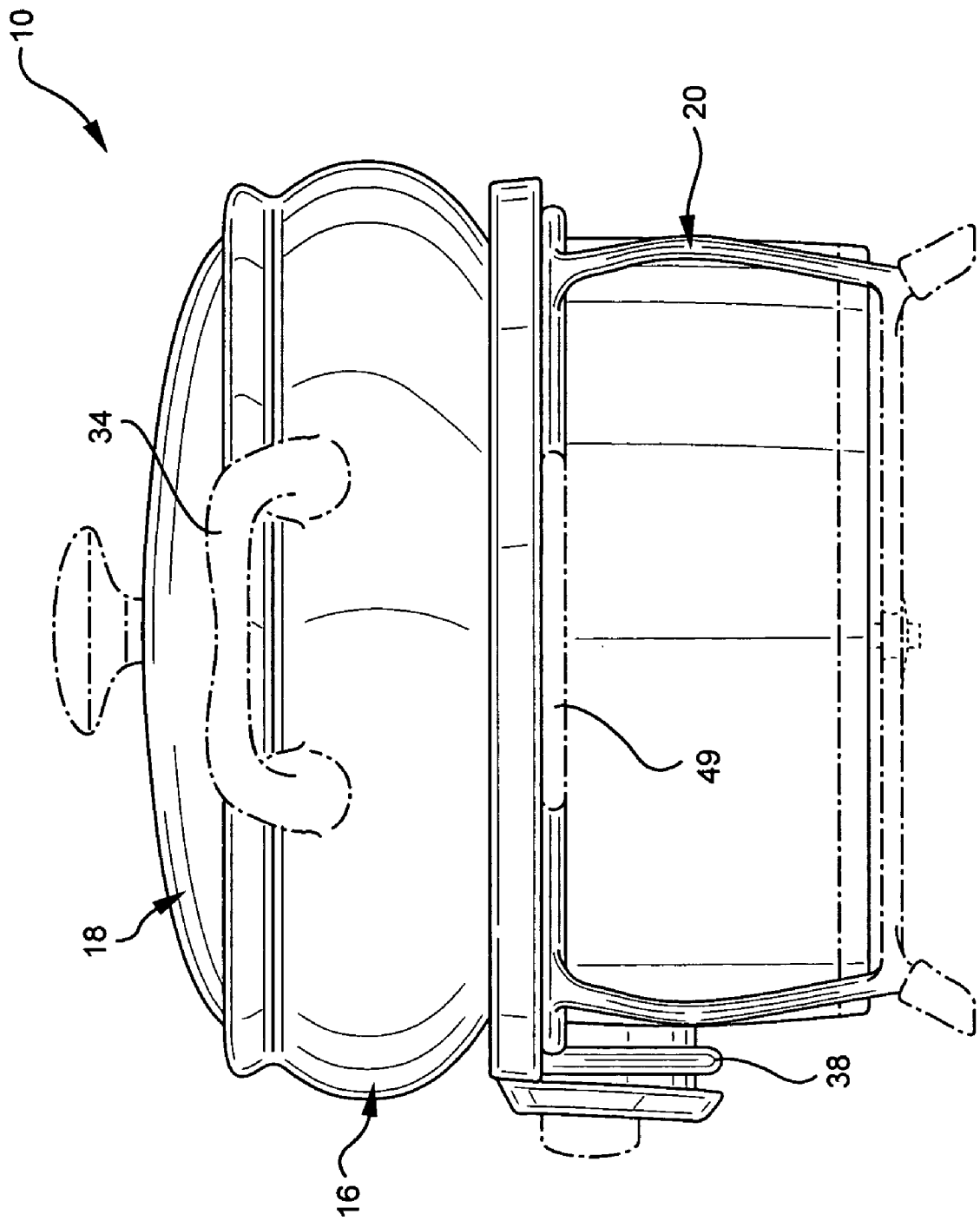
FIG. 4 is a side elevation view thereof, the opposite side being a mirror image thereof.
Figure 5:
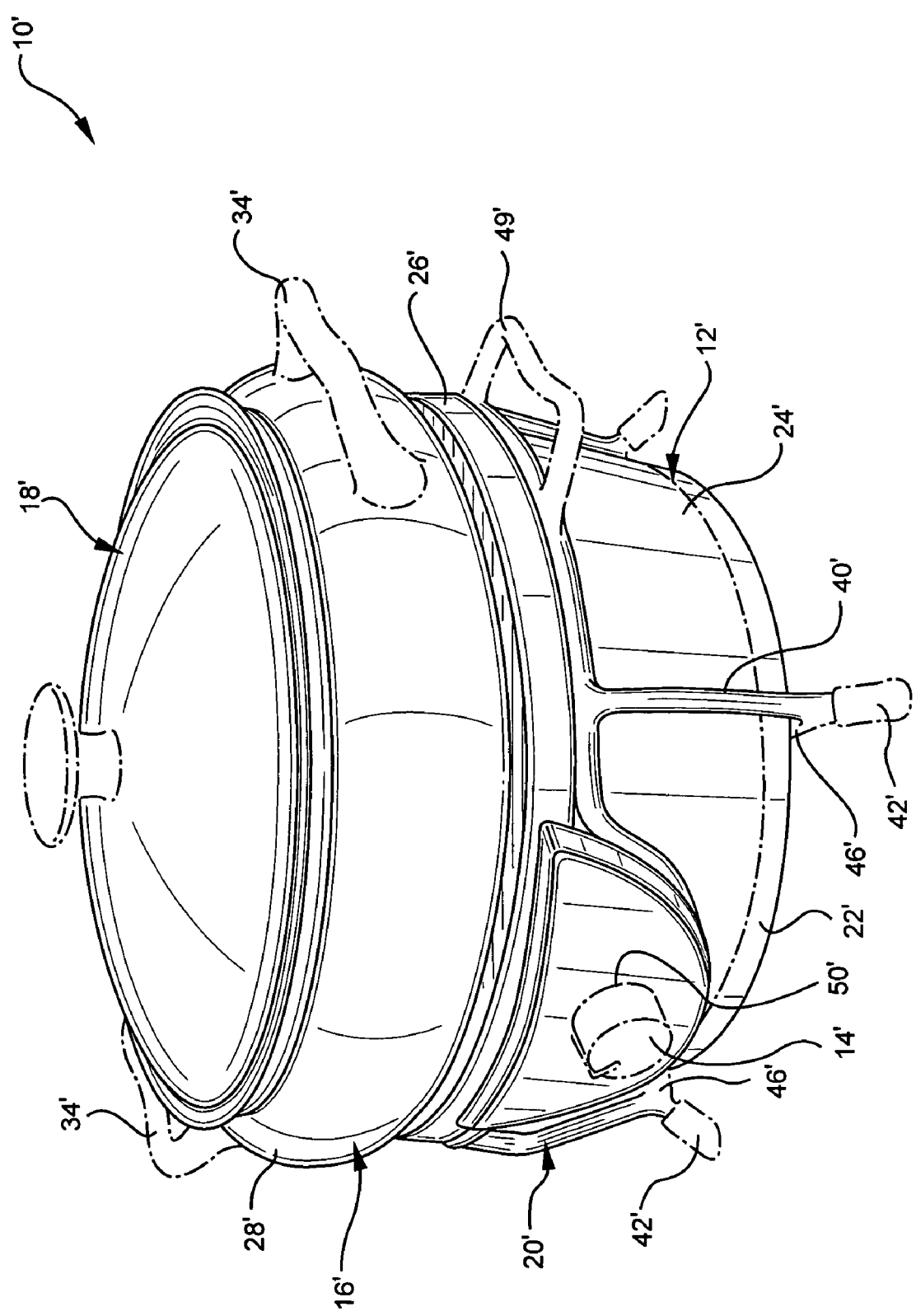
FIG. 5 is a top perspective view of a second embodiment of a slow cooker and stand according to the invention.
Figure 6:
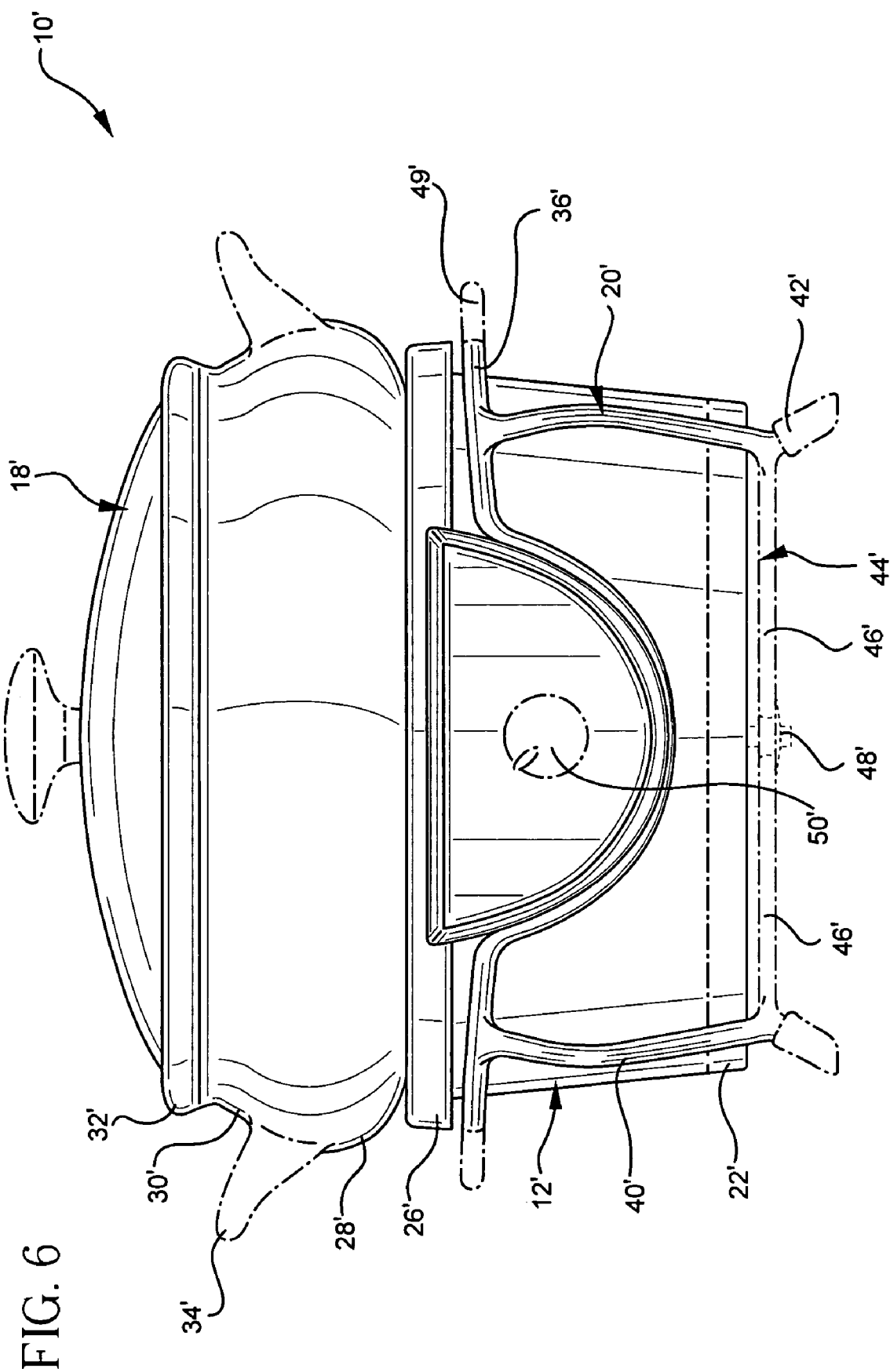
FIG. 6 is a front elevation view thereof.
Figure 7:
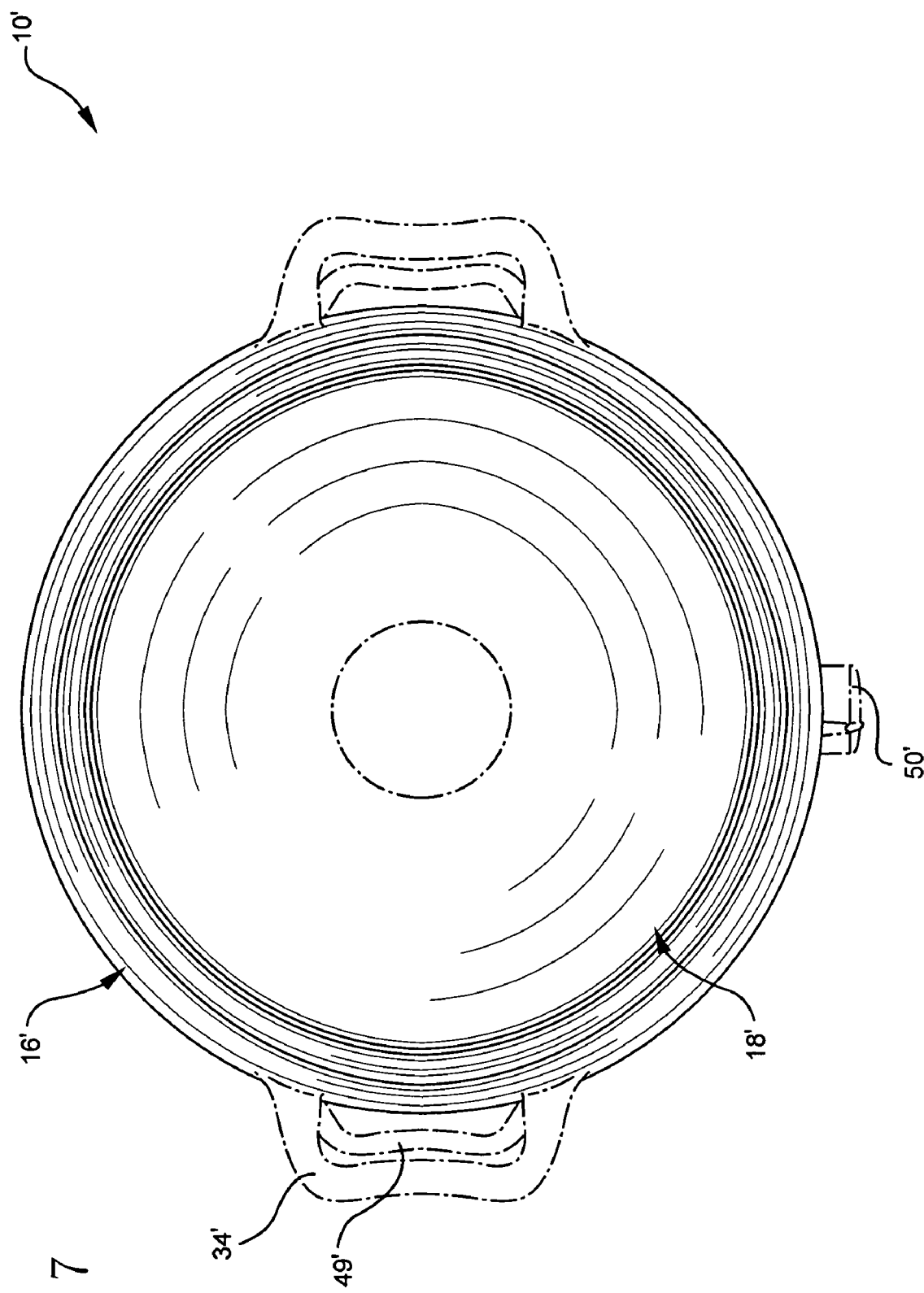
FIG. 7 is a top plan thereof.
Figure 8:
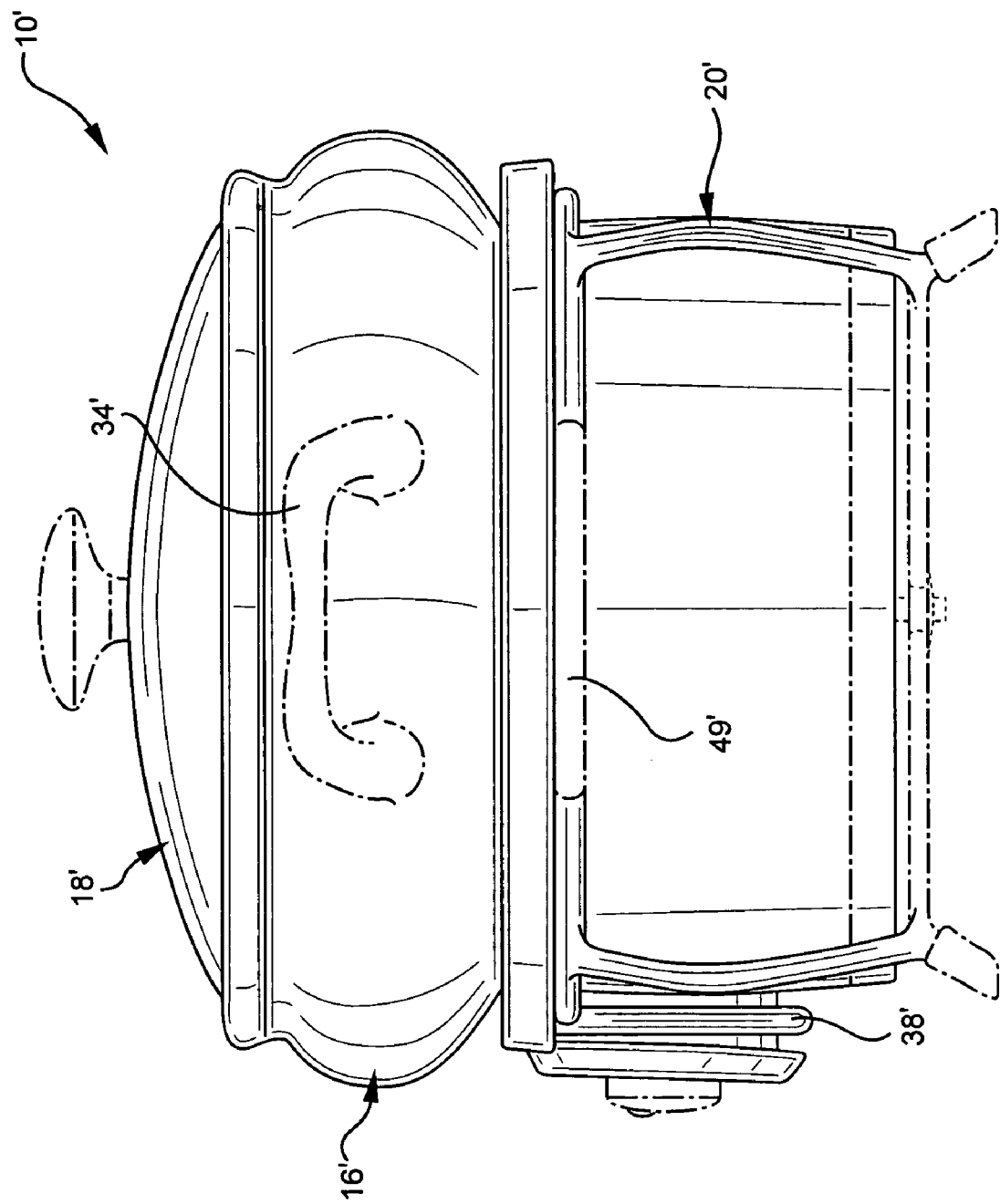
FIG. 8 is a side elevation view, the opposite side being a mirror image thereof.

The base 12 includes a plate-like bottom 22, a side wall 24, and an upper lip 26. As shown in FIGS. 2 and 4, the lip 26 extends radially outwardly beyond the upper end of the side wall 24. The side wall tapers inwardly between the upper lip 26 and bottom 22.

The cooking vessel 16 may be made of any ceramic material that is ordinarily used for slow cooker vessels. If the vessel is to be used on a stovetop, in an oven, or elsewhere such that temperatures higher than those associated with conventional slow cooking are expected, appropriate ceramic materials should be employed. Ceramic cooking vessels designed for cooking directly over a flame are sometimes referred to as "flameware". The ceramic material employed for such vessels may include petalite combined with clay and other materials. The vessel 16 includes a rounded side wall 28 that tapers radially inwardly towards the base 12, ultimately adjoining the top surface of the upper lip 26. The side wall also tapers inwardly in the direction of the lid. The top portion of the side wall 28 includes a peripheral recess 30 between the rounded portion and radially outwardly extending lip 32. Handles 34 extend from the side wall 28 and are located diametrically opposite from each other.

The stand 20 includes a substantially ring-shaped member 36 engaging the bottom surface of the lip 26 of the base. As shown in FIG. 4, the portion 38 of the stand adjacent the controller 14 extends around the arcuate bottom surface of the controller housing. A plurality of legs 40 extend downwardly from the ring-shaped member 36, terminating in a plurality of feet 42 connected to the legs. As shown in FIGS. 1, 2 and 4, the stand includes a support 44 comprised of elongate members 46 extending towards the center of the base from each leg. A fastener 48 connects the stand to the plate-like bottom 22. Handles 49 extend radially outwardly from opposite ends of the ring-shaped member 36.

The slow cooker 10 as described above cooks food in substantially the same manner as slow cookers known to the art. It is connected to a power supply by a power cord (see FIG. 9). Food is inserted within the cooking vessel 16 and the lid 18 applied. The dial 50 of the controller is rotated to a selected position, causing the heating element (see FIG. 9) within the base 12 to be actuated. Slow cooking generally takes four to eight hours.

FIGS. 5–8 disclose a second embodiment 10 of a slow cooker. The only difference between the second embodiment and that of FIGS. 1–4 are the shapes of the base, the cooking vessel, the lid and the ring-shaped member of the stand. These elements are substantially round in this embodiment as opposed to being generally oval in the first embodiment. The wall 24 tapers inwardly in both preferred embodiments. The same reference numerals are employed in both embodiments to designate similar elements, the numerals used in connection with the second embodiment being primed.

Either slow cooker 10, 10' may be transported by using the handles 49 on the stand 20. The cooking vessel 16 can be removed from the base 12 by using the handles 34 on opposite ends thereof. It has been found that the loop-style handles 34 remain relatively cool even after hours of cooking in the base 12. In addition to being well spaced from the top of the base 12, the handles 34 are connected at only two points to the body of the cooking vessel. This is believed to minimize heat transfer from the side wall 28 to the handle. The location of the handles 34 well below the top opening of the cooking vessel 16 is also believed to add convenience as compared to handles formed by extensions of the lip 32 that are found in prior art slow cooker vessels.

Figure 9:
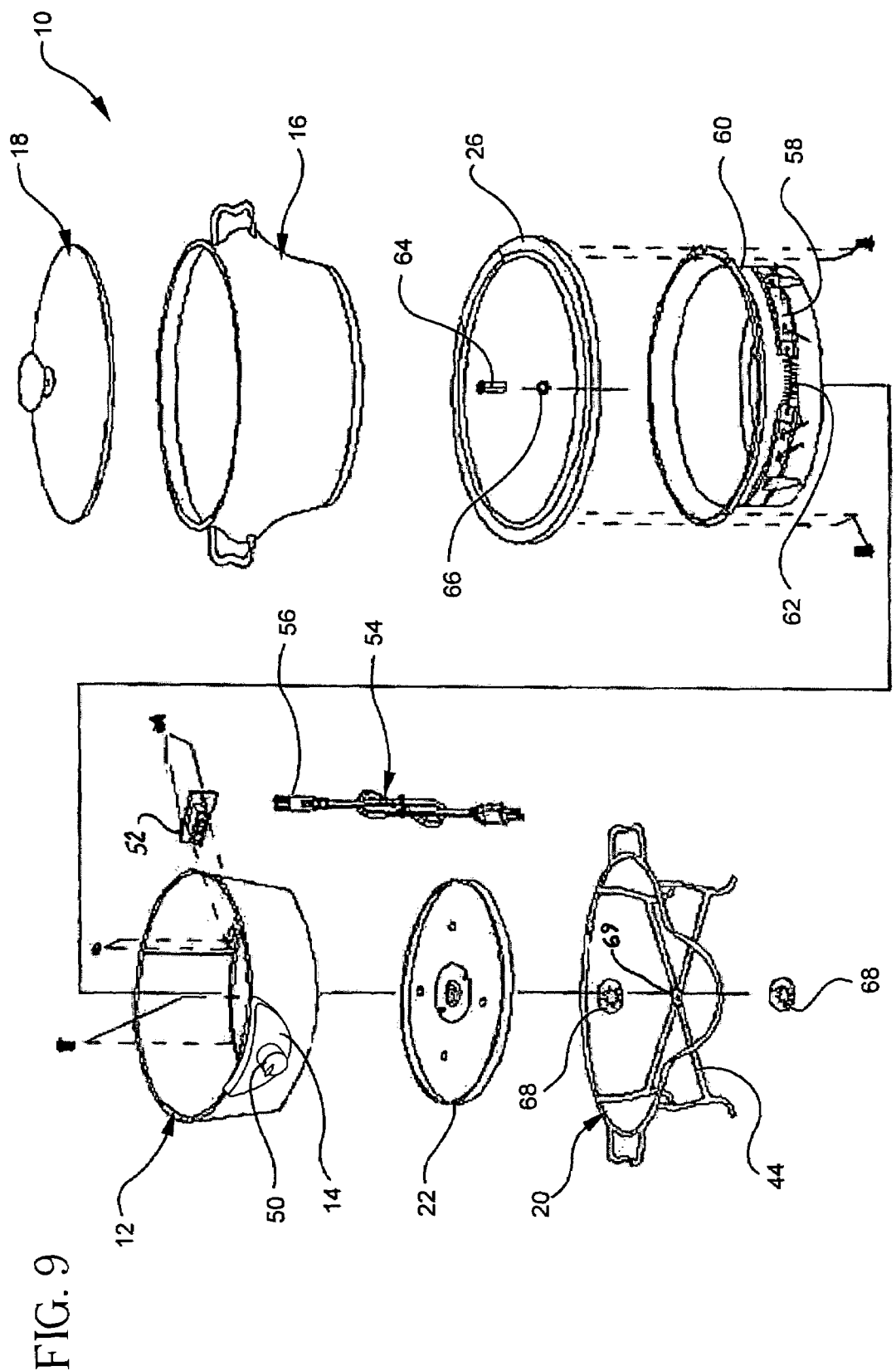
FIG. 9 is an exploded, perspective view of the slow cooker shown in FIGS. 1–4.

Referring to FIG. 9, the individual elements of a slow cooker such as that shown in FIGS. 1–4 are depicted. The same reference numerals as those used in connection with FIGS. 1–4 are used to designate common elements. In addition to the elements already described above, a power cord inlet 52 is shown as intended for removable coupling of a power cord to the rear side of the outer wall of the base. A power cord 54 is also shown. The cord includes one end for plugging into a wall outlet and a second end having a phenolic connector 56 for the inlet 52. A heating element 58 extending around a metal liner 60 is also shown. The ends of the heating element are connected by a spring 62. The liner and heating element, other than being relatively short to fit within the outer wall 24 of the base, are substantially conventional elements of slow cookers. The dimension of the cooking vessel 16 in this embodiment are such that about half the vessel extends within the liner 60 once the side wall 28 engages the lip 26. At least about one third of the vessel should extend within the liner to provide effection slow cooking. As discussed below, the liner further includes a flange adapted for connection to the lip 26. The fastener 48 is shown in greater detail. It is comprised of a tube 64 extending through openings in the liner 60, the plate-like bottom 22 and the support portion of the stand. The stand includes a center ring 69 to which the crossing members 46 of the support are joined that defines the opening for the tube. A silicon washer 66 is positioned between the head of the tube and the top surface of the liner. A pair of lock washers 68 are coupled to the tube 64. One lock washer adjoins the bottom surface of the support 44 of the stand 20 while the other adjoins the bottom surface of the plate-like bottom 22. It will be appreciated that other types of fasteners could be employed for coupling the stand to the base. Alternatively, the stand does not have to be connected by a fastener to the base and can instead be detachable therefrom.

Figure 11:
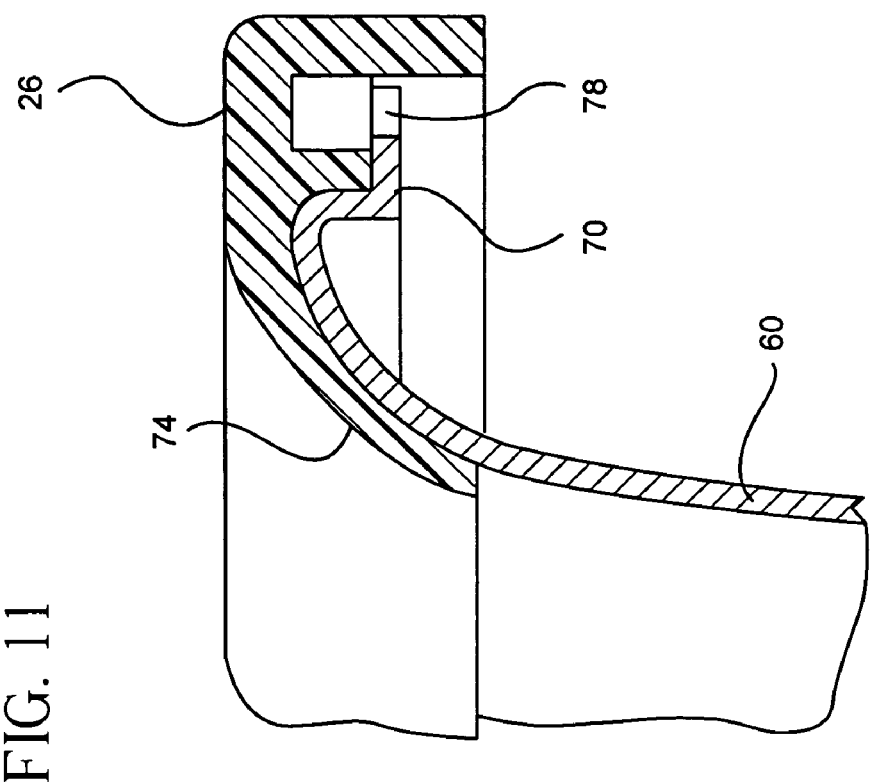
FIG. 11 is a second enlarged sectional view of the liner and lip of the slow cooker showing a vent opening in the flange of the liner.
Figure 10:
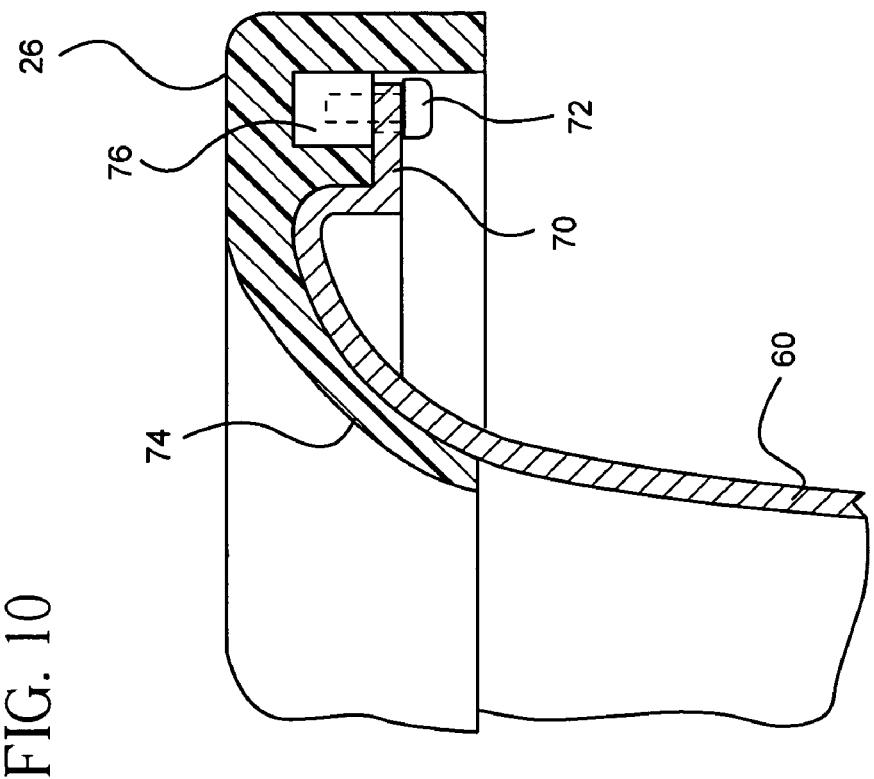
FIG. 10 is an enlarged sectional view of the liner and lip of the slow cooker shown in FIGS. 1–8.

FIGS. 10 and 11 show the configurations of the lip 26 and the upper end of the liner 60 to which it is coupled. The liner includes a peripheral flange 70 having a plurality of slots or openings through which screws 72 can extend. The flange is substantially horizontal. The lip 26 is comprised of a heat resistant polymeric material, and preferably a phenolic compound, capable of withstanding the temperatures ordinarily associated with slow cooking and the pressure of a cooking vessel filled with food to be cooked. Chang Chun Longlite PM T385J General Purpose Phenolic Molding Compound has been found to be satisfactory in meeting these requirements. This compound is rated as having a maximum service temperature of 401° F. The inner surface 74 of the lip is inclined to accommodate the bottom portion of the upper side wall 28 of the cooking vessel. A peripheral channel 76 is formed between the lip and liner. This channel is preferably vented, as shown in FIG. 11, by slots 78 in the flange 70. In a preferred embodiment, the flange 70 includes four sets of three slots. Each set of slots is equally spaced. The outer two slots of each set is aligned with a passage in the lip that receives the threaded part of the screw. The middle slot of each set is opposite the channel 76. The panel portion of the controller 14 is preferably made from the same phenolic material as the lip 26. It will be appreciated that the controller can be either mechanical as shown or electronic.

What is claimed is:

1. A slow cooker comprising:
   a base for heating a cooking vessel;
   a stand supporting said base;
   a controller mounted to said base;
   a ceramic cooking vessel engaging an upper surface of said base, said vessel including a side wall extending substantially above said upper surface of said base; and
   a lid mounted to said vessel.

2. A slow cooker as described in claim 1 including a pair of handles extending from said vessel side wall and positioned diametrically opposite from each other.

3. A slow cooker as described in claim 1 wherein said base includes an upper lip, said side wall of said vessel adjoining a top surface of said upper lip, said stand engaging a bottom surface of said upper lip.

4. A slow cooker as described in claim 3 wherein said stand includes a substantially ring-shaped member engaging said bottom surface of said lip, a plurality of legs extending downwardly from said ring-shaped member, and a plurality of feet positioned beneath said base.

5. A slow cooker as described in claim 4 wherein said stand includes a pair of handles extending diametrically opposite from each other.

6. A slow cooker as described in claim 5 wherein said handles of said stand extend from said ring-shaped member.

7. A slow cooker as described in claim 1 wherein said vessel side wall includes a portion extending radially inwardly towards said upper surface of said base.

8. A slow cooker as described in claim 7 wherein said side wall includes an arcuate outer surface extending about the circumference of said vessel, said side wall tapering radially inwardly in the direction of said base.

9. A slow cooker as described in claim 8 wherein said side wall of said vessel tapers radially inwardly in the direction of said lid.

10. A slow cooker as described in claim 7 including a pair of handles extending from said vessel side wall and positioned diametrically opposite from each other, each of said handles being connected at two points to said side wall and forming a loop spaced from said side wall.

11. A slow cooker comprising:
a base for heating a cooking vessel, said base including an upper lip, a plate-like bottom, and a side wall connecting said upper lip and plate-like bottom;
a controller mounted to said base;
a ceramic cooking vessel engaging an upper surface of said base;
a lid mounted to said vessel;
a stand supporting said base, said stand including a plurality of legs extending downwardly along said side wall of said base, feet coupled to said legs, said feet being positioned beneath said base, and a pair of diametrically opposed handles.

12. A slow cooker as described in claim 11 wherein said stand includes a substantially ring-shaped member adjoining said upper lip of said base, said handles being coupled to said substantially ring-shaped member.

13. A slow cooker as described in claim 12 including a fastener connecting said stand to said base.

14. A slow cooker as described in claim 13 wherein said fastener connects said stand to said plate-like bottom of said base.

15. A slow cooker as described in claim 12 wherein said cooking vessel extends substantially above said upper lip of said base.

16. A slow cooker as described in claim 15 wherein said cooking vessel includes a pair of handles positioned substantially above the location where said cooking vessel engages said base.

17. A slow cooker as described in claim 15 wherein said lip is comprised of a heat resistant polymeric material.

18. A slow cooker comprising:
a base for heating a cooking vessel;
a controller mounted to said base;
a ceramic cooking vessel engaging an upper surface of said base, said vessel including a side wall extending substantially above said upper surface of said base, said side wall further including an arcuate outer surface extending about the circumference of said vessel, said side wall tapering inwardly in the direction of said base and having a portion extending radially inwardly towards said upper surface of said base; and
a lid mounted to said vessel.

19. A slow cooker as described in claim 18 including a pair of handles extending from said vessel side wall and positioned diametrically opposite from each other.

20. A slow cooker comprising:
a base for heating a cooking vessel;
a stand supporting said base;
a controller mounted to said base;
a ceramic cooking vessel engaging an upper surface of said base, said vessel including a side wall extending substantially above said upper surface of said base and including a portion extending radially inwardly towards said upper surface of said base; and
a lid mounted to said vessel.

21. A slow cooker as described in claim 20 wherein said stand includes a pair of handles extending diametrically opposite from each other.

22. A slow cooker as described in claim 21 wherein said base includes an upper lip, said radially inwardly extending portion of said side wall adjoins a top surface of said upper lip and said stand engages a bottom surface of said upper lip.

23. A slow cooker as described in claim 22 wherein said stand includes a substantially ring-shaped member engaging said bottom surface of said lip and a plurality of legs extending downwardly from said ring-shaped member.

24. A slow cooker comprising:
a stand including a pair of handles extending diametrically opposite from each other;
a base for heating a cooking vessel, said base being mounted to said stand;
a controller mounted to said base;
a ceramic cooking vessel engaging an upper surface of said base, said vessel including a side wall extending substantially above said upper surface of said base; and
a lid mounted to said vessel.

* * * * *